(12) United States Patent
Wang et al.

(10) Patent No.: US 10,389,225 B2
(45) Date of Patent: Aug. 20, 2019

(54) SWITCHING POWER SUPPLY, PRIMARY CONTROL CHIP AND LOOP COMPENSATION DEVICE THEREOF

(71) Applicant: BYD COMPANY LIMITED, Shenzhen (CN)

(72) Inventors: Wenqing Wang, Shenzhen (CN); Yongjun Hou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/756,330

(22) PCT Filed: Sep. 5, 2016

(86) PCT No.: PCT/CN2016/098124
§ 371 (c)(1),
(2) Date: Feb. 28, 2018

(87) PCT Pub. No.: WO2017/041684
PCT Pub. Date: Mar. 16, 2017

(65) Prior Publication Data
US 2018/0248471 A1    Aug. 30, 2018

(30) Foreign Application Priority Data

Sep. 7, 2015 (CN) .......................... 2015 1 0562897

(51) Int. Cl.
*H02M 3/335* (2006.01)
*H02M 1/14* (2006.01)
(Continued)

(52) U.S. Cl.
CPC .............. *H02M 1/14* (2013.01); *H02M 1/08* (2013.01); *H02M 1/4258* (2013.01);
(Continued)

(58) Field of Classification Search
CPC . H02M 2001/0006; H02M 2001/0025; H02M 2001/0038; H02M 1/15; H02M 3/28; H02M 3/157
(Continued)

(56) References Cited

U.S. PATENT DOCUMENTS

2007/0216389 A1    9/2007  Nishida
2010/0123447 A1 *  5/2010  Vecera ..................... H02M 1/32
                                                          323/290
(Continued)

FOREIGN PATENT DOCUMENTS

CN          102523650 A       6/2012
CN          102983734 A       3/2013
(Continued)

OTHER PUBLICATIONS

Wang, Bin et al., "Digital DC/DC Switching Power Supply Loop Compensator Design" College of Automation, Chongqing University, Aug. 31, 2010, DOI : 10.3778/j.issn.1002-8331.2010.34_022, pp. 70-73.

*Primary Examiner* — Alex Torres-Rivera
(74) *Attorney, Agent, or Firm* — Anova Law Group, PLLC (57) ABSTRACT

The invention discloses a switching power supply, a primary control chip and a loop compensation device thereof. The loop compensation device comprises: an error amplifier; a switching logic gate, wherein the input end of the switching logic gate is connected with the output end of the error amplifier; a loop compensation capacitor, wherein one end of the loop compensation capacitor is connected with the output end of the switching logic gate, and the other end of the loop compensation capacitor is grounded; and a delay generation circuit, wherein the output end of the delay generation circuit is connected with the control end of the switching logic gate, and the delay generation circuit is used (Continued)

for outputting a valid switching control signal within a preset time after a power switch of the switching power supply is turned off to control the switching logic gate in a turn-on state, so that the loop compensation capacitor is charged/discharged by means of an error amplification signal outputted from the error amplifier. With the loop compensation device, the problem that the output ripple from the switching power supply is too large can be solved, and the loop stability is ensured.

7 Claims, 5 Drawing Sheets (51) Int. Cl.
*H02M 1/08* (2006.01)
*H02M 1/42* (2007.01)
*H02M 3/156* (2006.01)
*H02M 1/00* (2006.01)

(52) U.S. Cl.
CPC ....... *H02M 3/156* (2013.01); *H02M 3/33523* (2013.01); *H02M 2001/0025* (2013.01)

(58) Field of Classification Search
USPC ............................................ 363/21.04–21.18
See application file for complete search history.

(56) References Cited

U.S. PATENT DOCUMENTS

| | | | |
|---|---|---|---|
| 2011/0193539 | A1 | 8/2011 | Schmidt et al. |
| 2012/0032661 | A1 | 2/2012 | Nakamura |
| 2012/0327691 | A1* | 12/2012 | Strijker .................. H02M 1/32 363/21.01 |
| 2013/0038313 | A1* | 2/2013 | Gotoh .................... H02M 1/32 323/288 |
| 2013/0135905 | A1* | 5/2013 | Yeh .................. H02M 3/33507 363/21.01 |
| 2014/0266118 | A1* | 9/2014 | Chern .................. H02M 3/156 323/283 |
| 2015/0145439 | A1 | 5/2015 | Szolusha et al. |
| 2016/0329819 | A1* | 11/2016 | Chen ................ H02M 3/33515 |
| 2016/0336864 | A1* | 11/2016 | Fang ................ H02M 3/33515 |

FOREIGN PATENT DOCUMENTS

| | | |
|---|---|---|
| CN | 103023326 A | 4/2013 |
| CN | 103219868 A | 7/2013 |
| CN | 103683929 A | 3/2014 |
| CN | 203588108 U | 5/2014 |
| CN | 104702095 A | 6/2015 |
| CN | 105071651 A | 11/2015 |

* cited by examiner

SWITCHING POWER SUPPLY, PRIMARY CONTROL CHIP AND LOOP COMPENSATION DEVICE THEREOF

CROSS REFERENCE TO RELATED APPLICATION

The present application is a national phase entry under 35 U.S.C. § 371 of International Application No. WO/2017/041684, filed on Sep. 5, 2016, which claims the priority of Chinese Application No. 201510562897.1, filed on Sep. 7, 2015, the entire contents of all of which are herein incorporated by reference

FIELD OF THE INVENTION

The present invention relates to the technical field of charging power supplies and, particularly, relates to a loop compensation device for a switching power supply, a primary control chip with the loop compensation device, and a switching power supply.

BACKGROUND ART

Figure 1:
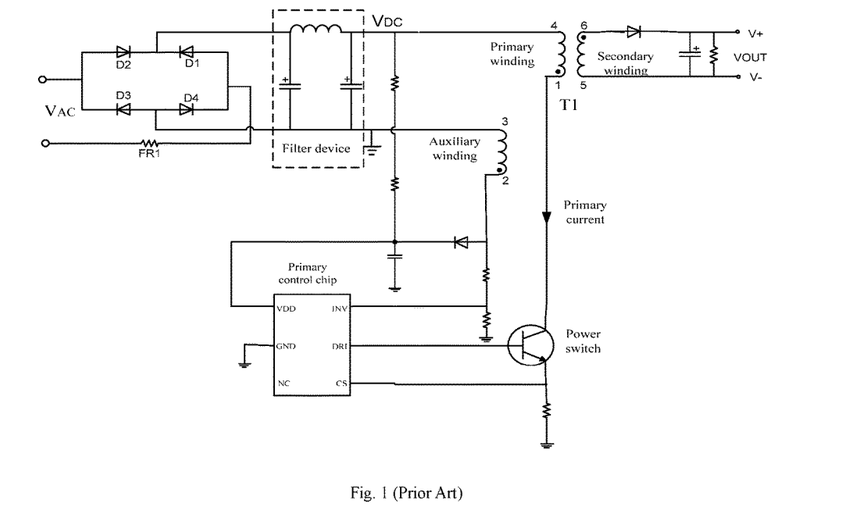
FIG. 1 is an application circuit diagram of a typical flyback switching power supply in the relevant art.

In relevant art, the application circuit diagram of a typical flyback switching power supply is shown as FIG. 1, in which the feedback sampling of an output is generally achieved by adopting sampling feedback with an auxiliary winding of a transformer. Wherein, FIG. 2 is a structural block diagram of a primary control chip in the typical switching power supply.

Figure 2:
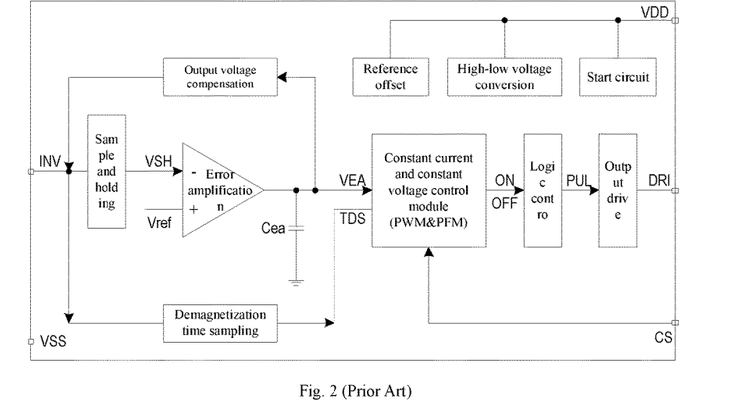
FIG. 2 is a structural block diagram of a primary control chip for the switching power supply in the relevant art.

By combining FIG. 1 and FIG. 2, constant voltage of a system is realized in such a way that the secondary voltage is sampled by the auxiliary winding, the sampled output voltage is provided to an error amplifier as an input and is subjected to error amplification with a reference voltage, and the turn-on time and the operation frequency of an external power switch are finally controlled. The loop compensation is mainly achieved by adding a compensation capacitor Cea to the output end of the error amplifier. However, the compensation method may cause the problem that the output ripple is too large because the loop cannot be stable within a range from light load to idle load.

SUMMARY OF THE DISCLOSURE

The present invention is aimed to solve one of the technical problems in the relevant art to at least a certain extent. Thus, the first objective of the present invention is to provide a loop compensation device for a switching power supply, which solves the problem that the output ripple of the system is too large and ensures the loop stability by controlling the output of the error amplifier.

The second objective of the present invention is to provide a primary control chip for a switching power supply. The third objective of the present invention is to provide a switching power supply.

In order to fulfill the above objective, an embodiment in the first aspect of the present invention provides a loop compensation device for a switching power supply, including: an error amplifier, wherein the first input end of the error amplifier is connected with the output end of a sample and hold circuit of a primary control chip in the switching power supply, the second input end of the error amplifier is connected with a first reference voltage reference end, and the error amplifier is used for obtaining an error amplification signal according to a sample and hold signal of the sample and hold circuit and a first reference voltage signal of the first reference voltage reference end; a switching logic gate, wherein the input end of the switching logic gate is connected with the output end of the error amplifier; a loop compensation capacitor, wherein one end of the loop compensation capacitor is connected with the output end of the switching logic gate, and the other end of the loop compensation capacitor is grounded; and a delay generation circuit, wherein the output end of the delay generation circuit is connected with the control end of the switching logic gate, and the delay generation circuit is used for outputting a valid switching control signal within a preset time after a power switch of the switching power supply is turned off to control the switching logic gate in a turn-on state, so that the loop compensation capacitor is charged/discharged by means of the error amplification signal outputted from the error amplifier.

According to the loop compensation device for the switching power supply in the embodiment of the present invention, the switching logic gate and the delay generation circuit for controlling the switching logic gate are added to the output end of the error amplifier, the delay generation circuit outputs a valid switching control signal within the preset time after the power switch is turned off to control the switching logic gate in a turn-on state, and the loop compensation capacitor is charged/discharged by means of the error amplification signal output by the error amplifier, such that loop compensation is realized in the switching power supply, and the output signal of the error amplifier is controlled via the switching logic gate.

In order to fulfill the above objective, an embodiment in the second aspect of the present invention provides a primary control chip for a switching power supply, including the loop compensation device for the switching power supply.

According to the primary control chip for the switching power supply in the embodiment of the present invention, the output signal of the error amplifier can be controlled via the switching logic gate, i.e., the loop compensation capacitor is charged/discharged by means of the output of the error amplifier only within a small period of time, namely the preset time after the power switch is turned off, to realize loop compensation. Thus the loop stability under light or idle load of the switching power supply is aimed; the output from the error amplifier can truly reflect the actual condition of the secondary output voltage under extremely low frequency on the premise that the high frequency operation of the switching power supply is not affected. The problem that the output ripple from the switching power supply is too large is solved, and the loop stability is ensured.

Moreover, an embodiment of the present invention further provides a switching power supply, including the primary control chip for the switching power supply.

The switching power supply in the embodiment of the present invention is aimed at loop stability under light or idle load, the output from the error amplifier can relatively truly reflect the actual condition of the secondary output voltage under extremely low frequency on the premise that high-frequency operation is not affected. The problem that the output ripple is too large is solved, and the loop stability is ensured.

DETAILED DESCRIPTION

The embodiments of the present invention will be described in detail below, the examples of the embodiments are shown in the accompanying drawings, and same or similar reference numerals throughout indicate same or similar elements or elements having same or similar functions. The embodiments described below by referring to the drawings are exemplary, and are aimed to interpret the present invention, rather than limiting the present invention.

The present application is proposed based on inventor's recognition and research on the following problems:

In the relevant art, the sampling mode with an auxiliary winding of a transformer is intermittent sampling, i.e., after a power switch is turned off, the interior of a primary control chip samples the voltage across the auxiliary winding. However, the voltage across the auxiliary winding can only reflect the output voltage within the secondary demagnetization time TDS, the output voltage can also only be sampled by the primary control chip within the secondary demagnetization time, whereas the feedback input of the error amplifier beyond the sampling time can be held by a sample and hold circuit, i.e., the error amplifier cannot track the change of the output voltage in real time. The secondary demagnetization time TDS=(NS/NP)·(1/Vout)·Lp·Ip, where NS/NP is a secondary/primary turn ratio, Vout is the output voltage, Lp is a primary inductance value, and Ip is the primary peak current.

Figure 3:
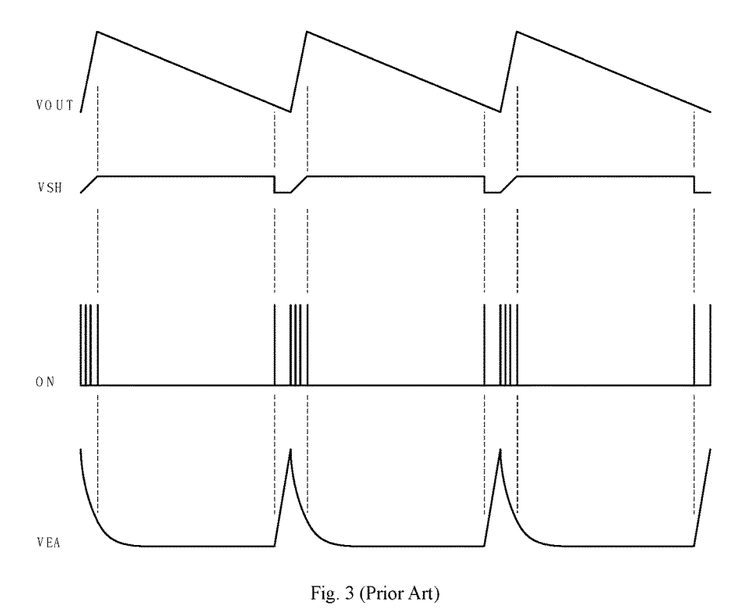
FIG. 3 is an operation waveform diagram of the typical flyback switching power supply in the relevant art.

Within the range from light load to idle load, the operation frequency of the system is often relatively low, the primary peak current is relatively low at the same time, the secondary demagnetization time, i.e., the sampling time, is very short relative to the operation cycle of the system at the moment. Thus, the change of the error amplifier is far behind the change of the output voltage such that the loop is difficult to stabilize. With the instability of the loop, the low-frequency ripple may be introduced, the output ripple of the system may be too large, and the specific waveform thereof is shown as FIG. 3.

Described below by reference to the accompanying drawings are a loop compensation device for a switching power supply, a primary control chip of the switching power supply with the loop compensation device and the switching power supply according to embodiments of the present invention.

Figure 4:
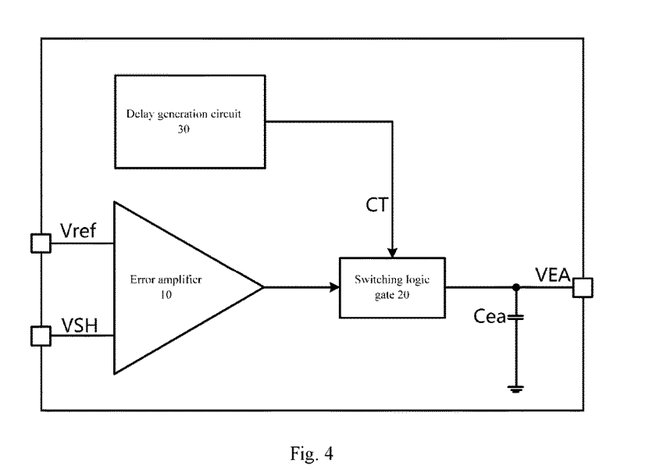
FIG. 4 is a structural block diagram of a loop compensation device for a switching power supply according to an embodiment of the present invention.

As shown in FIG. 4, a loop compensation device for a switching power supply according to an embodiment of the present invention includes an error amplifier 10, a switching logic gate 20, a loop compensation capacitor Cea, and a delay generation circuit 30.

The first input end of the error amplifier 10 is connected with the output end of a sample and hold circuit, the second input end of the error amplifier 10 is connected with a first reference voltage reference end, wherein the sample and hold circuit is used for performing sampling and holding the voltage of the output feedback end of the primary control chip in the switching power supply and outputting a sample and hold signal VSH via the output end thereof. The first reference voltage reference end provides a first reference voltage signal Vref. The error amplifier 10 is used for obtaining an error amplification signal VEA according to the sample and hold signal VSH of the sample and hold circuit and the first reference voltage signal Vref of the first reference voltage reference end. That is, the voltage of the output feedback end of the primary control chip in the switching power supply is subject to sample and hold of the sample and hold circuit to obtain the sample and hold signal VSH, then the voltage is compared with the given reference voltage via the error amplifier 10, and the error amplifier 10 amplifies the error quantity between the sample and hold signal VSH and the first reference voltage signal Vref and outputs it to a subsequent constant voltage and constant current control module to control the operation frequency and duty ratio of the power switch, so as to control the output voltage of the switching power supply. The input end of the switching logic gate 20 is connected with the output end of the error amplifier 10, one end of the loop compensation capacitor Cea is connected with the output end of the switching logic gate 20, and the other end of the loop compensation capacitor Cea is grounded. The output end of the delay generation circuit 30 is connected with the control end of the switching logic gate 20, and the delay generation circuit 30 is used for outputting a valid switching control signal, e.g., CT=1, within a preset time after the power switch of the switching power supply is turned off to control the switching logic gate 20 in a turn-on state, so that the loop compensation capacitor Cea is charged/discharged by means of the error amplification signal VEA outputted from the error amplifier 10, to realize loop compensation on the switching power supply.

Moreover, the delay generation circuit 30 is further used for outputting an invalid switching control signal, e.g., CT=0, beyond the preset time after the power switch is turned off to control the switching logic gate 20 in a turn-off state, so that the charging/discharging path of the loop compensation capacitor Cea is cut off, and the output voltage of the error amplifier 10 is held, i.e., the output voltage of the error amplifier 10 is the voltage of the error amplification signal VEA outputted from the error amplifier 10 at the moment.

That is, in the embodiment of the present invention, the delay generation circuit 30 is mainly used for generating a periodic switching control signal CT. CT is valid at the beginning of a cycle (the power switch is turned off), and becomes invalid within a period of time after the power switch is turned off, i.e., a preset time. The switching control signal CT controls the switching logic gate 20 connected with the output end of the error amplifier 10. The output VEA of the error amplifier 10 is connected to the loop compensation capacitor Cea within the period that the switching control signal CT is valid, and the error amplifier 10 compares the sample and hold signal VSH fed back by the output voltage with the first reference voltage signal Vref and amplifies. If VSH>Vref, the error amplifier 10 discharges the loop compensation capacitor Cea, and the voltage across the loop compensation capacitor Cea drops. On the contrary, if VSH<Vref, the error amplifier 10 charges the loop compensation capacitor Cea, and the voltage across the loop compensation capacitor Cea rises. In addition, if VSH=Vref, the error amplifier 10 holds the voltage of the output error amplification signal VEA. Beyond the period that the switching control signal CT is valid (CT being valid within the preset time after the power switch is turned off means that the time period from beginning of turn-off of the power switch to the end of the preset time is the valid time, and the remaining time is invalid), the output end of the error amplifier 10 is disconnected from the loop compensation capacitor Cea, at the moment, because the charging/discharging path of the loop compensation capacitor Cea is cut off, the voltage value across the loop compensation capacitor Cea can be held till the coming of the valid time of next CT, and the output voltage of the error amplifier 10 is held within a period of time after the power switch is turned off. The subsequent circuit such as the constant current and constant voltage control module (e.g., the pulse width modulation (PWM) & pulse frequency modulation (PFM) circuit), a logic control module and an output drive module in the primary control chip controls the operation frequency of the whole switching power supply and the turn-on time of the power switch according to the voltage across the loop compensation capacitor Cea.

According to an embodiment of the present invention, the delay generation circuit 30 generates a valid switching control signal under the control of a trigger signal SIN, wherein the trigger signal SIN may be a turn-off signal for the power switch. Specifically, SIN is a trigger signal for CT and is used for generating a beginning signal for the valid time of the CT, and because the CT becomes invalid within a period of time of delaying after the power switch is turned off, the trigger signal SIN of the delay generation circuit 30 is often the turn-off signal for the power switch. In consideration that the turn-on time of the power switch or the secondary demagnetization time TDS is relatively short and can be ignored within the valid time of the CT, SIN may also be a turn-on signal or a demagnetization signal for the power switch, e.g., a turn-on signal ON, a turn-off signal OFF, a drive signal DR1, a logic control signal PUL or a secondary demagnetization signal TDS for the power switch in FIG. 2.

Figure 5:
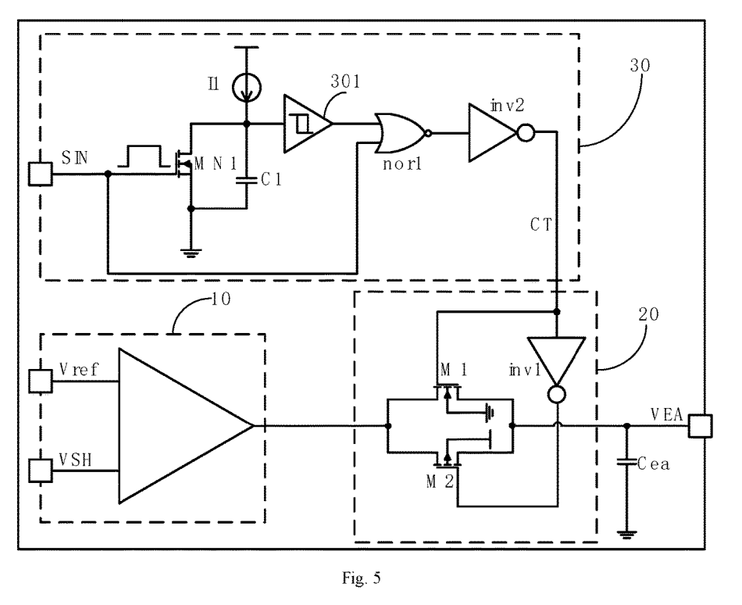
FIG. 5 is a circuit schematic diagram of the loop compensation device for the switching power supply according to an embodiment of the present invention.
Figure 6:
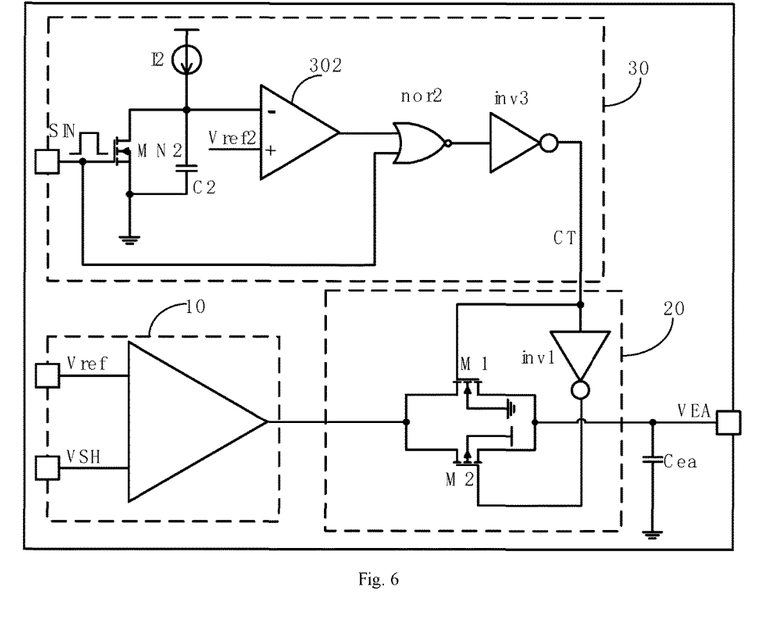
FIG. 6 is a circuit schematic diagram of the loop compensation device for the switching power supply according to another embodiment of the present invention.

Specifically, in one embodiment of the present invention, as shown in FIG. 5 or FIG. 6, the switching logic gate 20 specifically includes a first inverter inv1, a first switch M1 and a second switch M2. The input end of the first inverter inv1 is connected with the output end of the delay generation circuit 30, the first end of the first switch M1 is connected with the first end of the second switch M2 and then connected with the output end of the error amplifier 10, the second end of the first switch M1 is connected with the output end of the delay generation circuit 30, the second end of the second switch M2 is connected with the output end of the first inverter inv1, and the third end of the first switch M1 is connected with the third end of the second switch M2 and then serves as the output end of the switching logic gate 20. Both the first switch M1 and the second switch M2 are MOS (Metal Oxide Semiconductor) transistors.

As shown in FIG. 5, the delay generation circuit 30 specifically includes a first NMOS (N-type Metal Oxide Semiconductor) transistor MN1, a first capacitor C1, a Schmitt trigger 301, a first NOR gate nor1 and a second inverter inv2. The gate of the first NMOS transistor MN1 serves as the trigger end of the delay generation circuit 30 to receive the trigger signal SIN, the drain of the first NMOS transistor MN1 is connected with a first current source I1, and the source of the first NMOS transistor MN1 is grounded; the first capacitor C1 is connected in parallel between the drain and the source of the first NMOS transistor MN1, the input end of the Schmitt trigger 301 is connected with the drain of the first NMOS transistor MN1, the first input end of the first NOR gate nor1 is connected with the output end of the Schmitt trigger 301, and the second input end of the first NOR gate nor1 is connected with the gate of the first NMOS transistor MN1; the input end of the second inverter inv2 is connected with the output end of the first NOR gate nor1, and the output end of the second inverter inv2 serves as the output end of the delay generation circuit 30.

According to another embodiment of the present invention, as shown in FIG. 6, the delay generation circuit 30 specifically includes a second NMOS transistor MN2, a second capacitor C2, a comparator 302, a second NOR gate nor2 and a third inverter inv3. The gate of the second NMOS transistor MN2 serves as the trigger end of the delay generation circuit 30 to receive the trigger signal SIN, the drain of the second NMOS transistor MN2 is connected with a second current source I2, and the source of the second NMOS transistor MN2 is grounded; the second capacitor C2 is connected in parallel between the drain and the source of the second NMOS transistor MN2, the negative input end of the comparator 302 is connected with the drain of the second NMOS transistor MN2, the positive input end of the comparator 302 is connected with a second reference voltage reference end, the second reference voltage reference end provides a second reference voltage signal Vref2, the first input end of the second NOR gate nor2 is connected with the output end of the comparator 302, and the second input end of the second NOR gate nor2 is connected with the gate of the second NMOS transistor MN2; the input end of the third inverter inv3 is connected with the output end of the second NOR gate nor2, and the output end of the third inverter inv3 serves as the output end of the delay generation circuit 30.

In an example that the secondary demagnetization signal TDS is used as the trigger signal SIN, the secondary demagnetization begins after the power switch is turned off, TDS='1' at the moment, the MN1 in the delay generation circuit 30 is turned on, the capacitor C1 is reset, the voltage VC1 across the capacitor C1 is '0', the Schmitt trigger 301 outputs '1', the NOR gate nor1 outputs '0', and CT='1'; after the secondary demagnetization ends, TDS is changed from '1' to '0', the Schmitt trigger 301 still outputs '1', thus, CT holds '1', TDS='0', the first current source I1 charges the capacitor C1, the voltage across the capacitor C1 gradually rises, and when the voltage VC1 across the capacitor C1 rises till the output of the Schmitt trigger is inverted, the output CT is '0'. In an embodiment of the present invention, the time of CT='1' can be adjusted by adjusting the capacitor C1 and the first current source I1; if the capacitance is higher, the current is lower, and the delay time is longer, i.e., the valid time of the CT is longer, that is, the preset time is determined according to the capacitance of the first capacitor C1 and the current amplitude of the first current source I1, and the preset time is positively correlated to the capacitance of the first capacitor and negatively correlated to the current amplitude of the first current source. When CT='1', the switches M1 and M2 in the switching logic gate 20 are turned on, the output of the error amplifier 10 is connected to the loop compensation capacitor Cea at the same time, and the error amplifier 10 can normally compare and amplify the input sample and hold signal VSH and the first reference voltage signal Vref; once CT='0', the switches M1 and M2 in the switching logic gate 20 are turned off, and the output of the error amplifier 10 is disconnected from the loop compensation capacitor Cea, so that the charging/discharging path of the loop compensation capacitor Cea is cut off Because the charging/discharging path of the loop compensation capacitor Cea is cut off, the loop compensation capacitor Cea can hold the previous compared and amplified value, and the voltage across the loop compensation capacitor Cea controls the subsequent circuit.

FIG. 6 is another circuit implementation scheme of the loop compensation device for the switching power supply in an embodiment of the present invention, wherein the Schmitt trigger 301 in FIG. 5 is substituted by the comparator 302. When SIN='1', the capacitor C2 is reset, the output of the comparator 302 is '1', and CT='1' at the moment; when SIN='0', the second current source 12 charges the capacitor C2; and once the voltage VC2 across the capacitor C2 exceeds the Vref2, the comparator 302 is inverted, and CT='0'. Similarly, when CT='1', the output of the error amplifier 10 is connected to the loop compensation capacitor Cea; on the contrary, when CT='0', the output of the error amplifier 10 is disconnected from the loop compensation capacitor Cea, and the voltage across the loop compensation capacitor Cea is held till next SIN='1' comes.

Figure 7:
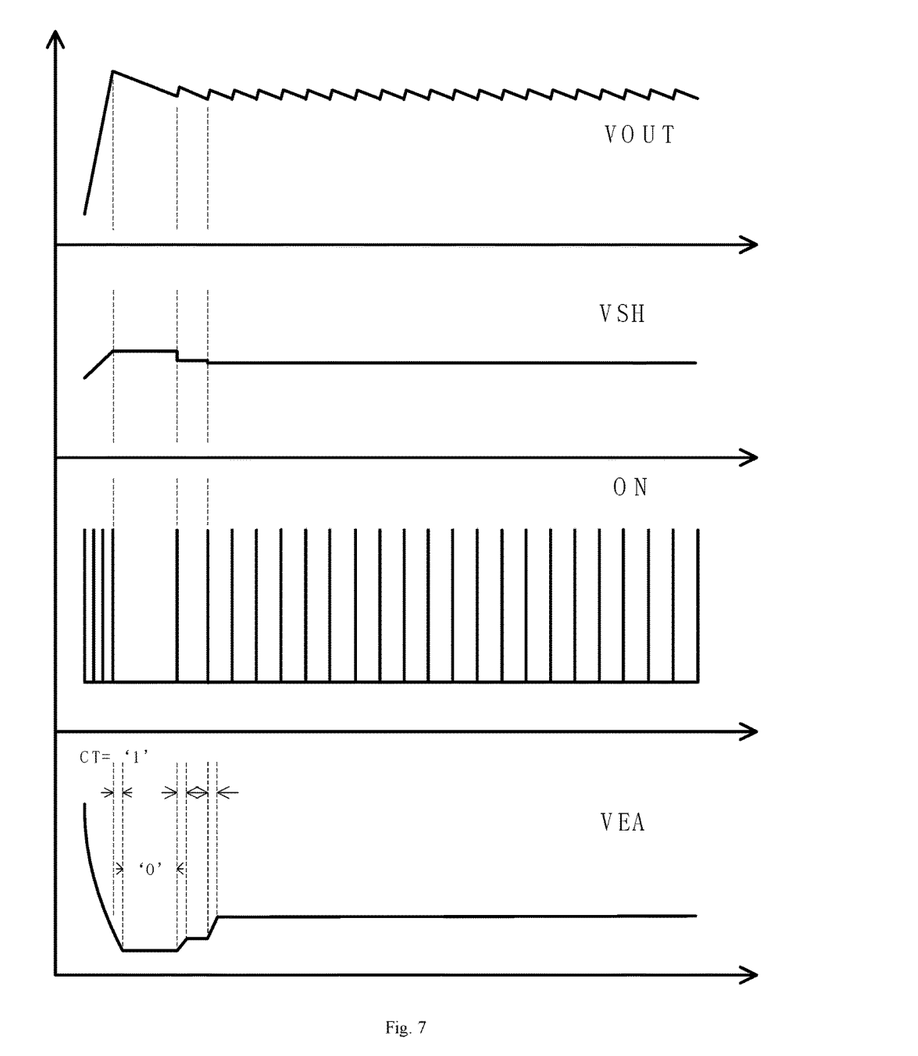
FIG. 7 is an operation waveform diagram of the switching power supply according to an embodiment of the present invention.

Specifically, as shown in FIG. 7, VEA is changed with the change of the input signal within the time CT='1', but maintains unchanged within the time CT='0' (time beyond CT='1' in a cycle). Compared with FIG. 3, the VEA can follow the change of the output voltage under relatively low frequency, so that loop stability of the switching power supply is effectively promoted.

According to the loop compensation device for the switching power supply in the embodiment of the present invention, with the switching logic gate and the delay generation circuit for controlling the switching logic gate added to the output end of the error amplifier, the delay generation circuit outputs a valid switching control signal within the preset time after the power switch is turned off to control the switching logic gate in a turn-on state, the loop compensation capacitor is charged/discharged by means of the error amplification signal outputted from the error amplifier, loop compensation is thus realized in the switching power supply, and the output signal of the error amplifier is controlled via the switching logic gate, i.e., the loop compensation capacitor is charged/discharged by means of the output of the error amplifier only within a small period of time, namely the preset time after the power switch is turned off, to realize loop compensation. Thus, the loop compensation device for the switching power supply in the embodiment of the present invention can realize the loop stability under the condition of light or idle load. The output of the error amplifier can relatively truly reflect the actual situation of the secondary output voltage under very low frequency on the premise that high-frequency operation of the switching power supply is not affected. The problem that output ripple of the switching power supply is too large is solved, and the loop stability is ensured.

Moreover, an embodiment of the present invention provides a primary control chip for a switching power supply, including the loop compensation device for the switching power supply.

According to the primary control chip for the switching power supply in the embodiment of the present invention, the output signal of the error amplifier can be controlled via the switching logic gate, i.e., the loop compensation capacitor is charged/discharged by means of the output of the error amplifier only within a small period of time, namely the preset time after the power switch is turned off, to realize loop compensation, so that the loop stability under light or idle load of the switching power supply can be aimed at, and the output of the error amplifier can relatively truly reflect the actual situation of the secondary output voltage under extremely low frequency on the premise that high-frequency operation of the switching power supply is not affected, The problem that the output ripple from the switching power supply is too large is solved, and the loop stability is ensured.

Finally, an embodiment of the present invention further provides a switching power supply, including the primary control chip for the switching power supply.

The switching power supply in the embodiment of the present invention aims at the loop stability under light or idle load. The output of the error amplifier can relatively truly reflect the actual situation of secondary output voltage under extremely low frequency on the premise that high-frequency operation is not affected, the problem that the output ripple is too large is solved, and the loop stability is ensured.

In the description of the present invention, it should be understood that directions or position relations indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential" and the like are based on those shown in the accompanying drawings, which are merely for the sake of describing the present invention and simplifying the description, rather than indicating or implying the referred devices or elements must have specific directions or be constructed or operated in the specific directions, so they cannot be understood as limiting the present invention.

Moreover, the terms "first" and "second" are merely for the sake of description, but cannot be understood as indicating or implying the relative importance or implying the quantity of the indicated technical features. Thus, the features defined with "first" and "second" may explicitly or implicitly include at least one of the features. In the description of the present invention, "multiple" means at least two, e.g., two, three, etc., unless otherwise specified.

In the present invention, unless otherwise specified and defined, the terms "mounted", "connected", "fixed" and the like should be understood broadly, e.g., "connected" may be fixedly connected, detachably connected, or integrally connected, may be mechanically connected, or electrically connected, may be directly connected, indirectly connected via a medium, communicating between two elements or interacting between two elements, unless otherwise specified. The specific meanings of the terms in the present invention could be understood by those of ordinary skill in the art according to specific circumstance.

In the present invention, unless otherwise specified and defined, the first feature "on" or "under" the second feature may be direct contact of the first and the second features, or indirect contact of the first and the second features via a medium. Moreover, the first feature "on", "above" or "upper" the second feature may be the first feature right above or obliquely above of the second feature, or only expresses that the horizontal height of the first feature is higher than that of the second feature. The first feature "under", "below" or "down" the second feature may be the first feature right below or obliquely below the second feature, or only expresses that the horizontal height of the first feature is smaller than that of the second feature.

In the description of this specification, reference terms "one embodiment", "some embodiments", "example", "specific example", or "some examples" and the like mean that the specific features, structures, materials or characteristics described in combination with the embodiments or examples are included in at least one embodiment or example of the present application. In the present specification, the schematic expression of the terms may not necessarily indicate the same embodiment or example. Moreover, the described specific features, structures, materials or characteristics can be appropriately combined in any or more embodiments or examples. Moreover, different embodiments or examples described in the present specification and the features of the different embodiments or examples can be combined by those skilled in the art without contradiction.

Although the embodiments of the present invention are shown and described above, it could be understood that the embodiments are exemplary and cannot be understood as limiting the present invention. Changes, modifications, substitutions and variations could be made to the embodiments by those of ordinary skill in the art within the scope of the present invention.

The invention claimed is:

1. A loop compensation device for a switching power supply, comprising:
    an error amplifier, wherein a first input end of the error amplifier is connected with an output end of a sample and holding circuit of the primary control chip in the switching power supply, a second input end of the error amplifier is connected with a first reference voltage reference end, and the error amplifier is used for obtaining an error amplification signal according to a sample and holding signal of the sample and holding circuit and a first reference voltage signal of the first reference voltage reference end;
    a switching logic gate, wherein an input end of the switching logic gate is connected with the output end of the error amplifier;
    a loop compensation capacitor, wherein one end of the loop compensation capacitor is connected with an output end of the switching logic gate, and the other end of the loop compensation capacitor is grounded; and
    a delay generation circuit, wherein an output end of the delay generation circuit is connected with a control end of the switching logic gate, and the delay generation circuit is used for outputting a valid switching control signal within a preset time after a power switch of the switching power supply is turned off to control the switching logic gate in a turn-on state, so that the loop compensation capacitor is charged/discharged by the error amplification signal outputted from the error amplifier,
    wherein:
    the delay generation circuit is further used for outputting an invalid switching control signal beyond the preset time after the power switch is turned off to control the switching logic gate in a turn-off state, so that a charge/discharge path of the loop compensation capacitor is cut off, and the output voltage of the error amplifier is held.

2. A loop compensation device for a switching power supply, comprising:
    an error amplifier, wherein a first input end of the error amplifier is connected with an output end of a sample and holding circuit of the primary control chip in the switching power supply, a second input end of the error amplifier is connected with a first reference voltage reference end, and the error amplifier is used for obtaining an error amplification signal according to a sample and holding signal of the sample and holding circuit and a first reference voltage signal of the first reference voltage reference end;
    a switching logic gate, wherein an input end of the switching logic gate is connected with the output end of the error amplifier;
    a loop compensation capacitor, wherein one end of the loop compensation capacitor is connected with an output end of the switching logic gate, and the other end of the loop compensation capacitor is grounded; and
    a delay generation circuit, wherein an output end of the delay generation circuit is connected with a control end of the switching logic gate, and the delay generation circuit is used for outputting a valid switching control signal within a preset time after a power switch of the switching power supply is turned off to control the switching logic gate in a turn-on state, so that the loop compensation capacitor is charged/discharged by the error amplification signal outputted from the error amplifier,
    wherein:
    the delay generation circuit generates the valid switching control signal under the control of a trigger signal, wherein the trigger signal is a turn-off signal for the power switch.

3. The loop compensation device for the switching power supply according to claim 2, wherein the switching logic gate specifically comprises:
    a first inverter, wherein an input end of the first inverter is connected with the output end of the delay generation circuit; and
    a first switch and a second switch, wherein a first end of the first switch is connected with a first end of the second switch and then connected with the output end of the error amplifier, a second end of the first switch is connected with the output end of the delay generation circuit, a second end of the second switch is connected with an output end of the first inverter, and a third end of the first switch is connected with a third end of the second switch and then serves as the output end of the switching logic gate.

4. The loop compensation device for the switching power supply according to claim 2, wherein the delay generation circuit specifically comprises:
    a first NMOS transistor, wherein a gate of the first NMOS transistor serves as a trigger end of the delay generation circuit to receive the trigger signal, a drain of the first NMOS transistor is connected with a first current source, and a source of the first NMOS transistor is grounded;
    a first capacitor, which is connected in parallel between the drain and the source of the first NMOS transistor;
    a Schmitt trigger, wherein an input end of the Schmitt trigger is connected with the drain of the first NMOS transistor;
    a first NOR gate, wherein a first input end of the first NOR gate is connected with an output end of the Schmitt trigger, and a second input end of the first NOR gate is connected with the gate of the first NMOS transistor; and
    a second inverter, wherein an input end of the second inverter is connected with an output end of the first NOR gate, and an output end of the second inverter serves as the output end of the delay generation circuit.

5. The loop compensation device for the switching power supply according to claim 4, wherein:
    the preset time is determined according to a capacitance of the first capacitor and a current amplitude of the first current source.

6. The loop compensation device for the switching power supply according to claim 5, wherein:
the preset time is positively correlated to the capacitance of the first capacitor and negatively correlated to the current amplitude of the first current source.

7. The loop compensation device for the switching power supply according to claim 2, wherein the delay generation circuit specifically comprises:
a second NMOS transistor, wherein a gate of the second NMOS transistor serves as the trigger end of the delay generation circuit to receive the trigger signal, a drain of the second NMOS transistor is connected with a second current source, and a source of the second NMOS transistor is grounded;
a second capacitor, which is connected in parallel between the drain and the source of the second NMOS transistor;
a comparator, wherein a negative input end of the comparator is connected with the drain of the second NMOS transistor, and a positive input end of the comparator is connected with a second reference voltage reference end;
a second NOR gate, wherein the first input end of the second NOR gate is connected with the output end of the comparator, and a second input end of the second NOR gate is connected with the gate of the second NMOS transistor; and
a third inverter, wherein an input end of the third inverter is connected with an output end of the second NOR gate, and an output end of the third inverter serves as the output end of the delay generation circuit.

* * * * *